United States Patent
Vasseur et al.

(10) Patent No.: US 7,599,302 B2
(45) Date of Patent: Oct. 6, 2009

(54) DYNAMIC ENFORCEMENT OF MPLS-TE INTER-DOMAIN POLICY AND QOS

(75) Inventors: Jean-Philippe Vasseur, Dunstable, MA (US); Francois LeFaucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 11/184,586

(22) Filed: Jul. 19, 2005

(65) Prior Publication Data

US 2007/0019558 A1   Jan. 25, 2007

(51) Int. Cl.
*H04J 3/14* (2006.01)
(52) U.S. Cl. .................. 370/248; 370/395.21
(58) Field of Classification Search ........... None
See application file for complete search history.

(56) References Cited

U.S. PATENT DOCUMENTS

| | | | |
|---|---|---|---|
| 6,167,445 A | 12/2000 | Gai et al. | |
| 6,286,052 B1 | 9/2001 | McCloghrie et al. | |
| 6,327,618 B1 | 12/2001 | Ahlstrom et al. | |
| 6,434,624 B1 | 8/2002 | Gai et al. | |
| 6,466,984 B1 | 10/2002 | Naveh et al. | |
| 6,519,254 B1 * | 2/2003 | Chuah et al. | 370/389 |
| 6,651,101 B1 | 11/2003 | Gai et al. | |
| 6,678,264 B1 | 1/2004 | Gibson | |
| 6,714,987 B1 | 3/2004 | Amin et al. | |
| 6,718,380 B1 | 4/2004 | Mohaban et al. | |
| 6,822,940 B1 | 11/2004 | Zavalkovsky et al. | |
| 6,839,766 B1 | 1/2005 | Parnafes et al. | |
| 6,876,668 B1 | 4/2005 | Chawla et al. | |
| 7,190,698 B2 * | 3/2007 | Svanberg et al. | 370/395.2 |

(Continued)

OTHER PUBLICATIONS

Notification of Transmittal of the International Search Report and the Written Opinion of the International Searching Authority, or the Declaration, Date of Mailing: Feb. 15, 2007, International Application No. PCT/US06/27809, International Filing Date Jul. 17, 2006, Cisco Technology, Inc. 10 pages.

(Continued)

*Primary Examiner*—Frank Duong
(74) *Attorney, Agent, or Firm*—Cesari and McKenna LLP (57) ABSTRACT

A technique dynamically enforces inter-domain policy and quality of service (QoS) for Traffic Engineering (TE) Label Switched Paths (LSPs) between a local domain and a remote domain in a computer network. According to the enforcement technique, a Path Computation Element (PCE) of the local domain receives a path computation request for an inter-domain TE-LSP from the remote domain, and triggers a policy verification procedure at a Policy Decision Point (PDP) of the local domain. The PDP determines whether the requested TE-LSP is allowed based on configured policy for the remote domain and previously established TE-LSPs from the remote domain. In the event the requested TE-LSP is allowed and subsequently established, a Policy Enforcement Point (PEP) along the TE-LSP, e.g., a border router of the local domain or a dedicated server, updates the PDP with the state of the TE-LSP. In response to the update, the PDP returns a QoS template indicating configured QoS guidelines the PEP must enforce for that TE-LSP. If the TE-LSP is eventually torn down, the PEP again updates the PDP with the state of the TE-LSP.

18 Claims, 6 Drawing Sheets

U.S. PATENT DOCUMENTS

2003/0228147 A1    12/2003    Brahim
2004/0223457 A1    11/2004    Oran
2005/0128951 A1    6/2005    Chawla et al.

OTHER PUBLICATIONS

Zhang, et al., IETF Internet Draft entitled MPLS Inter-AS Traffic Engineering Requirements (draft-ietf-tewg-interas-mpls-te-req---09.txt), Sep. 2004, pp. 1-26.

Durham, et al., Network Working Group RFC 2748 entitled, The COPS (Common Open Policy Service) Protocol, Jan. 2000, pp. 1-36.

Herzog, et al., Network Working Group RFC 2749 entitled, COPS Usage for RSVP, Jan. 2000, pp. 1-16.

Rekhter, et al., Network Working Group RFC 1771 entitled, A Border Gateway Protocol 4 (BGP-4), Mar. 1995, pp. 1-54.

Vasseur et al., Network Working Group Internet Draft entitled, RSVP Path Computation Request and Reply Messages (draft-vasseur-mpls-computation-rsvp-05.txt), Jul. 2004, pp. 1-31.

Callon, R., Network Working Group RFC 1195 entitled, Use of OSI IS-IS for Routing in TCP/IP and Dual Environments, Dec. 1990, pp. 1-80.

Awduche, et al., Network Working Group RFC 3209 entitled, RSVP-TE: Extensions to RSVP for LSP Tunnels, Dec. 2001, pp. 1-43.

Smit, H., Network Group RFC 3784 entitled, Intermediate Systemt o Intermediate System (IS-IS) Extensions for Traffic Engineering (TE), 2004.

Network Working Group RFC 3945 entitled, Generalized Multi-Protocol Label Switching (GMPLS) Architecture, Oct. 2004, pp. 1-65.

Mannie, et al., Network Group RFC 3946 entitled, Generalized Multi-Protocol Label Switching (GMPLS) Extensions for Synchronous Optical Network (SONET) and Synchronous Digital Hirarchy (SDH) Control, Oct. 2004, pp. 1-25.

Braden, et al., Network Working Group RFC 2205 entitled, Resource Reservation Protocol (RSVP)—Version 1 Functional Specification, Sep. 1997, pp. 1-105.

Katz, et al., Network Working Group RFC 3630 entitled, Traffic Engineering (TE) Extensions to OSPF Version 2, Sep. 2003, pp. 1-14.

Vasseur, et al., Path Computation Element (PCE) communication Protocol (PCEP)—Version 1 (draft-vasseur-pce-pcep-01.txt), Internet Draft, Jul. 2005.

Moy, J., Network Working Group RFC 2328 entitled, OSPF Version 2, Apr. 1998, pp. 1-183.

U.S. Appl. No. 11/049,587, filed Feb. 2, 2005, entitled Inter-Domain Path Computation Technique, by Vasseur et al.

U.S. Appl. No. 10/767,574, filed Sep. 18, 2003, entitled Computing Inter-Autonomous System MPLS Traffic Engineering LSP Paths, by Vasseur et al.

* cited by examiner

STATE TABLE 500

| CLASS TYPE 505 | PREEMPTION VALUE 510 | NUMBER OF TE-LSPs 515 | TOTAL BANDWIDTH 520 | . . . |
|---|---|---|---|---|
| A | 1 | 5 | 40 | |
| A | 2 | 0 | 0 | |
| ⋮ | ⋮ | ⋮ | ⋮ | . . . |
| B | 1 | 3 | 18 | |
| B | 2 | 1 | 5 | |
| ⋮ | ⋮ | ⋮ | ⋮ | |
| C | 1 | 10 | 20 | |
| ⋮ | ⋮ | ⋮ | ⋮ | |
| ⋮ | | | | |
| N/A | N/A | 19 | 83 | . . . |

ENTRIES 525 (rows above totals)
ENTRY TOTALS 526 (bottom row)

DYNAMIC ENFORCEMENT OF MPLS-TE INTER-DOMAIN POLICY AND QOS

BACKGROUND OF THE INVENTION

1. Field of the Invention

The present invention relates to computer networks and more particularly to enforcing inter-domain policy and quality of service (QoS) for Traffic Engineering (TE) Label Switched Paths (LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, inter-domain routers executing inter-domain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of its surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). Examples of such a distributed PCE architecture are described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, and U.S. patent application Ser. No. 11/049,587, entitled INTER-DOMAIN PATH COMPUTATION TECHNIQUE, filed by Vasseur et al., on Feb. 2, 2005, the contents of both which are hereby incorporated by reference in their entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

In order to ensure that the traffic of the data flow remains within the reserved resources, QoS enforcement generally consists of policing (dropping), shaping (buffering), or marking packets that are carried over a given TE-LSP so that traffic is conditioned in accordance with the QoS parameters signaled by RSVP messages during establishment of the TE-LSP. For example, if a TE-LSP has reserved 5 Megabits per second (Mb/s) of bandwidth through a given node, that node may enforce the reservation by dropping packets transmitted at a higher bandwidth. The QoS enforcement may also conform to a number of configurable parameters, such as, e.g., a tolerable margin (a percent greater than the reserved constraints), burst allowance (the tolerable margin above the reserved constraints for a certain length of time), etc.

Service providers may use a set of rules or a "policy" about the traffic within their domain (e.g., within an AS). These policies may include traffic limitations for individual nodes within the domain, general limitations on the total amount of traffic within the domain, etc. Typically, when a node attempts to establish a traffic flow (e.g., a TE-LSP) through a Policy Enforcement Point (PEP), the PEP may request permission from a policy server within the domain. The policy server (e.g., a Policy Decision Point, PDP) determines whether to permit or deny the request, based on the policy and the current state of traffic within the domain (e.g., active data flows), and responds accordingly. An example of a policy-based communication protocol is detailed in RFC 2748, entitled *The COPS (Common Open Policy Service) Protocol* dated January 2000, and for RSVP in RFC 2749, entitled *COPS Usage for RSVP* dated January 2000, which are hereby incorporated by reference as though fully set forth herein.

Often, two or more service providers will have a policy regarding the traffic that is allowed to flow between the providers (e.g., between two ASes). For example, a first service provider may limit a second service provider to transmitting 100 Mb/s into the first service provider's domain, or may limit the second service provider to ten TE-LSPs into the domain, etc. These inter-domain policies are helpful to avoid excessive traffic flows into a local domain from a remote domain, and may also help enforce contractual agreements between the two or more service providers. Notably, proposed requirements for such inter-domain or inter-operator MPLS-TE traffic is further discussed in Zhang, Vasseur, et al. *MPLS Inter-AS Traffic Engineering Requirements <draft-ietf-tewg-interas-mpls-te-req-09.txt>*, Internet Draft, September 2004, which is hereby incorporated by reference as though fully set forth herein.

One problem, however, lies in the inability to efficiently enforce inter-domain policy and QoS. Because most inter-domain configurations involve multiple exit/entry links, the receiving domain (local domain) is generally unable to properly predict which entrance the sending domain (remote domain) will use to send traffic into the local domain. For instance, assume that there are two possible entrances to the local domain from the remote domain, and that the local domain policy limits the remote domain to send 10 Mb/s of total traffic into the local domain. Without first knowing where to enforce the policy, the options are to either apply a 100 Mb/s enforcement to one link and deny use of the other, or to arbitrarily split the bandwidth over the links, e.g., 50% to each link. In the first instance, all the traffic traverses a single link, which is undesirable, while in the second instance, any data flows requiring over 50% of the resources will be unable to select either link. Currently, in many networks this problem manifests as a lack of any means of enforcement other than a manual monitoring of network traffic trends and subsequent human negotiation of inter-domain policy terms and compliance.

In addition, there is currently no interaction between inter-domain path computation and inter-domain policy enforcement. As mentioned above, there are various options available (e.g., using PCEs) to compute inter-domain paths, but the computation of those paths is currently independent of inter-domain policy, such that a computed path may actually be out of policy. There remains a need, therefore, for a system and method to efficiently enforce inter-domain policy and QoS, and to correlate the enforcement with the initial computation of inter-domain paths.

SUMMARY OF THE INVENTION

The present invention is directed to a technique for dynamically enforcing inter-domain policy and quality of service (QoS) for Traffic Engineering (TE) Label Switched Paths (LSPs) between a local domain and a remote domain in a computer network. According to the enforcement technique, a Path Computation Element (PCE) of the local domain receives a path computation request for an inter-domain TE-LSP from the remote domain, and sends a policy verification request to a Policy Decision Point (PDP) of the local domain. The PDP determines whether the requested TE-LSP is allowed based on configured policy for the remote domain and previously established TE-LSPs from the remote domain. In the event the requested TE-LSP is allowed and subsequently established, a Policy Enforcement Point (PEP) along the TE-LSP, e.g., a border router of the local domain or a dedicated server, updates the PDP with the state of the TE-LSP. In response to the update, the PDP returns a QoS template indicating configured QoS guidelines the PEP must enforce for that TE-LSP. If the TE-LSP is eventually torn down, the PEP again updates the PDP with the state of the TE-LSP.

In the illustrative embodiment described herein, communications with the PDP are transmitted in accordance with the Common Open Policy Service (COPS) Protocol. Each PCE may create a COPS Protocol Request message (REQ) that is used to request a policy decision regarding the TE-LSP in question, to which the PDP may return a COPS Protocol Decision message (DEC). Once the TE-LSP is set up, the PEP may create a COPS Protocol Report State message (RPT) to report the success of the TE-LSP. Notably, the COPS Protocol messages may include one or more novel COPS objects used to convey information in accordance with the present invention.

In accordance with one aspect of the present invention, the PCE in the local domain receives a path computation request having a set of constraints for the desired path, and determines the relevant subset of constraints based on local configuration (e.g., bandwidth, preemption, pool-type, etc.). The PCE sends a request (e.g., a COPS REQ) to the local PDP listing the subset of constraints to check and an identification of the remote domain (and possibly the source address) from which the path computation request was received. The PDP receives the request and determines whether to allow or deny the request based on the subset of constraints as compared to local policy configuration and the current state of other TE-LSPs. The local policy constraints may be configured for individual TE-LSPs, individual links, a set of links, a particular inter-domain set of links, or an overall inter-domain policy. Notably, a semi-stateful implementation of the PDP may be necessary because the policy decision depends on currently established inter-domain TE-LSPs. Upon making a policy-based decision, the PDP returns the appropriate response (e.g., a COPS DEC) to the PCE, which either continues path computation or rejects the request accordingly. Additionally, the PCE may adjust its path computation based on information returned by the PDP.

In accordance with another aspect of the present invention, after the path computation request is allowed and completed, the local PEP (e.g., a border router, BR) receives a signal to establish the TE-LSP, and appropriate traffic conditioning mechanisms are activated and configured on the PEP. In addition to configuring conventional RSVP-TE parameters (e.g., bandwidth), the PEP sends a TE-LSP "state notification" message (e.g., a COPS RPT) to the local PDP to update the PDP of the state of the TE-LSP. In response, the PDP replies to the PEP with a QoS template, which the PEP enforces upon traffic over the TE-LSP (e.g., policing or shaping traffic either strictly or with a tolerable margin, etc.). When the TE-LSP is to be torn down, the PEP sends another state notification message to the local PDP to again update the state of the TE-LSP such that the PDP is aware of freed resources for policy-based decision making.

Advantageously, the novel technique dynamically enforces inter-domain policy and QoS for TE-LSPs between a local domain and a remote domain in a computer network. By creating a novel interdependency between the PCE and PDP, the inventive technique provides an efficient mechanism for dynamically maintaining inter-domain policies on TE-LSPs while computing paths between domains and for enforcing an appropriate QoS on each TE-LSP once the TE-LSP is set up at a PEP. Also, the inventive technique provides an alternative to sub-optimal inter-domain policy and QoS techniques, such as cumbersome manual configuration, that can dynamically adjust to actual traffic patterns of the computer network.

BRIEF DESCRIPTION OF THE DRAWINGS

The above and further advantages of the invention may be better understood by referring to the following description in conjunction with the accompanying drawings in which like reference numerals indicate identical or functionally similar elements, of which.

DETAILED DESCRIPTION OF AN ILLUSTRATIVE EMBODIMENT

Figure 1:
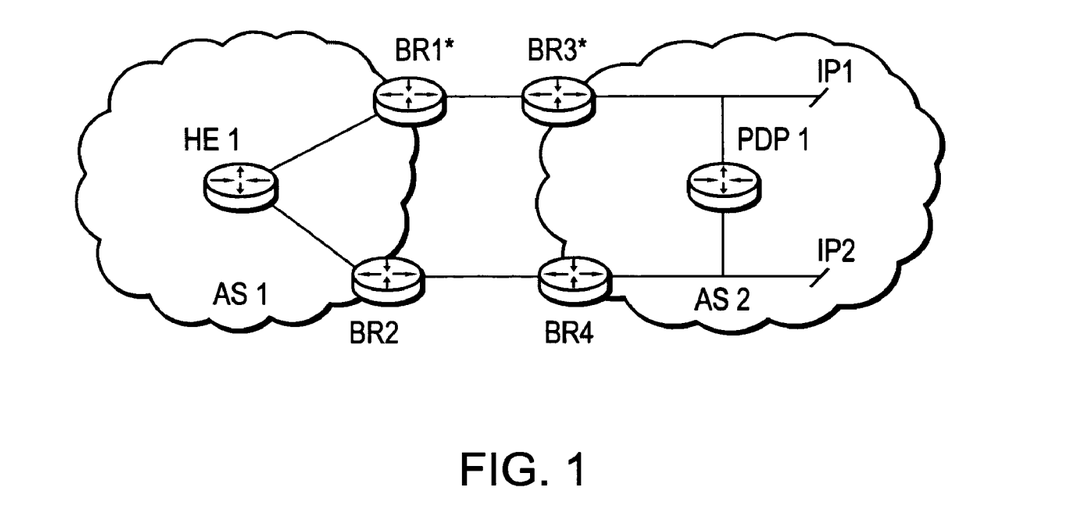
FIG. 1 is a schematic block diagram of an exemplary computer network that may be used in accordance with the present invention.

FIG. 1 is a schematic block diagram of an exemplary computer network 100 comprising interconnected autonomous systems AS1 and AS2. An Autonomous System (AS) is herein defined to be a group of intermediate nodes, such as inter-domain and/or intradomain routers, within a network that are subject to a common authority and execute one or more inter-domain and/or intradomain routing protocols. Although each AS is illustratively an autonomous system, those skilled in the art will appreciate that the ASes may alternatively be configured as routing domains or other networks or subnetworks. To that end, AS1 includes inter-domain routers, such as AS border routers BR1* and BR2, through which communication, such as data packets, may be exchanged with AS border routers BR3* and BR4, respectively of AS2. Notably, the "*" indicates that the border routers are configured as Path Computation Elements (PCEs) as described herein. AS1 further includes exemplary intradomain router HE1, while AS2 includes exemplary node and/or intradomain router PDP1. Moreover, address prefixes IP1 and IP2 are reachable via AS2. Those skilled in the art will understand that any number of nodes or routers may be used in the ASes, and that any number of ASes may be contained within the network 100 interconnected in various other configurations. These examples are merely representative, and the view shown herein is for simplicity.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
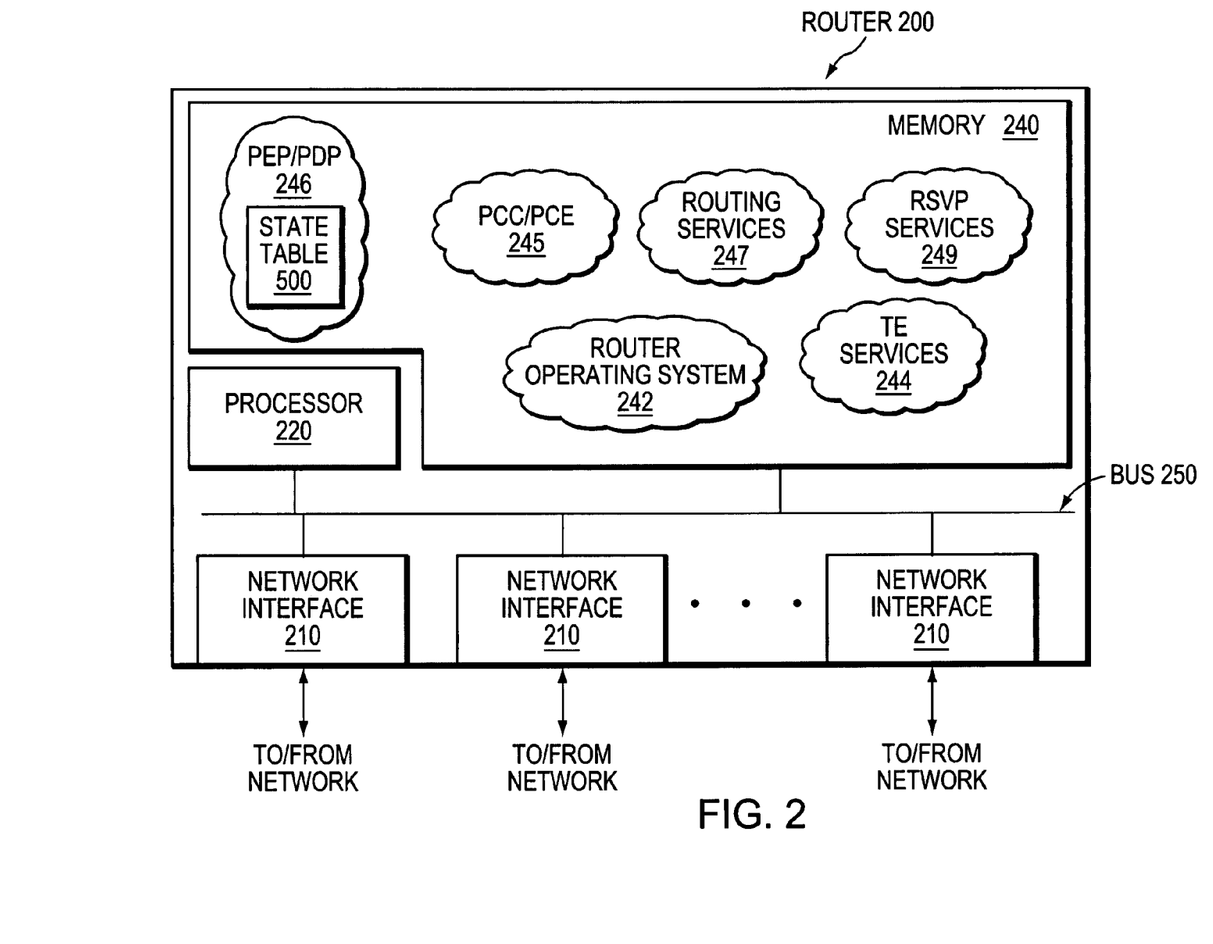
FIG. 2 is schematic block diagram of an exemplary node or router that may be advantageously used with the present invention.

FIG. 2 is a schematic block diagram of an exemplary router (or node) 200 that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as state table 500. A router operating system 242, portions of which is typically resident in memory 240 and executed by the processor, functionally organizes the router by, inter alia, invoking network operations in support of software processes and/or services executing on the router. These software processes and/or services include routing services 247, PCC/PCE services 245, Traffic Engineering (TE) services 244, RSVP services 249, and PEP/PDP services 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above. TE services 244 contain computer executable instructions for operating TE functions in accordance with the present invention. Examples of Traffic Engineering are described in RFC 3209, RFC 3784, and RFC 3630 as incorporated above, and in RFC 3473, entitled *Generalized Multi-Protocol Label Switching (GMPLS) Signaling Resource ReSerVation Protocol-Traffic Engineering (RSVP-TE) Extensions* dated January 2003, which is hereby incorporated by reference in its entirety.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages* <draft-vasseur-mpls-computation-rsvp-05.txt>, Internet Draft, July 2004, or in Vasseur, et al., *Path Computation Element (PCE) communication Protocol (PCEP)—Version 1* <draft-vasseur-pce-pcep-01.txt>, Internet Draft, July 2005, which are hereby incorporated by reference as though fully set forth herein. It should be understood that the use of these protocols serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

As noted above, service providers may define a set of rules or a "policy" about the traffic within their domain (e.g., within an AS). When a node attempts to establish a traffic flow (e.g., a TE-LSP) through a Policy Enforcement Point (PEP), the PEP requests permission from a policy server within the domain. The policy server (e.g., a Policy Decision Point, PDP) determines whether to permit or deny the request, based on the current state of traffic within the domain (e.g., active data flows) and responds accordingly.

Figure 3:
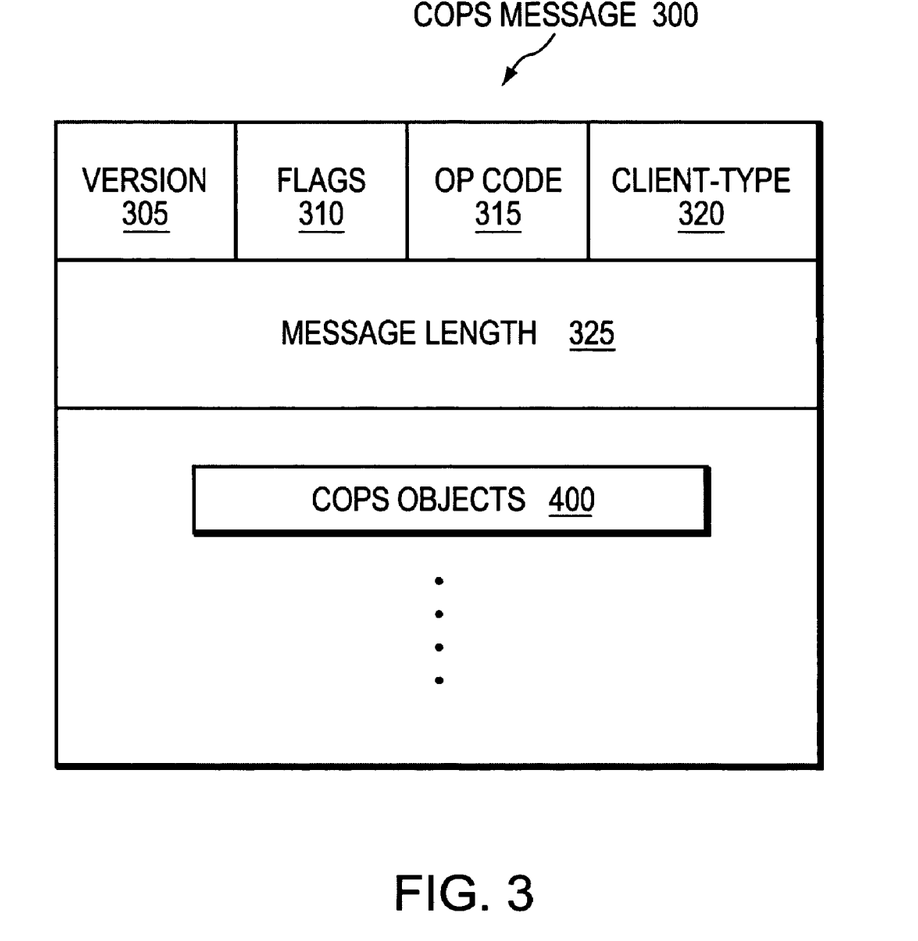
FIG. 3 is a schematic block diagram of portions of a COPS Protocol message that may be advantageously used with the present invention.

FIG. 3 illustrates an exemplary COPS Protocol message 300 that may be communicated with the policy server (PDP). The message includes a common header having Version field 305, Flags field 310, Op Code field 315, Client-type field 320, and a Message Length field 325. The Version field 305 stores a value that identifies the version of the COPS Protocol used (e.g., 1). The Flags field 310 stores various flag values used by the COPS Protocol, such as to indicate whether the message is solicited by another COPS message. The Op Code field 315 stores a value that identifies the COPS operation contained within the message 300, such as, inter alia, a Request message (REQ), a Decision message (DEC), a Report State message (RPT), etc. The Client-type field 320 identifies the node in communication with the PDP, the policy client. The Message Length field 325 contains the size of the message, generally in octets, which includes the standard COPS header and all encapsulated COPS objects 400, detailed below. Notably, each COPS object 400 is used to convey the operation-specific data required. The COPS Protocol is further described in above-incorporated RFC 2748. Those skilled in the art will understand that the use of the COPS Protocol is merely an example, and that other communication protocols may be used within the spirit and scope of the present invention.

The present invention is directed to a technique for dynamically enforcing inter-domain policy and QoS for TE-LSPs between a local domain and a remote domain in a computer network. According to the enforcement technique, a Path Computation Element (PCE) of the local domain receives a path computation request for an inter-domain TE-LSP from the remote domain, and sends a policy verification request to a PDP of the local domain. The PDP determines whether the requested TE-LSP is allowed based on configured policy for the remote domain and previously established TE-LSPs from the remote domain. In the event the requested TE-LSP is allowed and subsequently established, a PEP along the TE-LSP, e.g., a border router of the local domain or a dedicated server, updates the PDP with the state of the TE-LSP. In response to the update, the PDP returns a QoS template indicating configured QoS guidelines the PEP must enforce for that TE-LSP. If the TE-LSP is eventually destroyed ("torn down"), the PEP again updates the PDP with the state of the TE-LSP.

Figure 4:
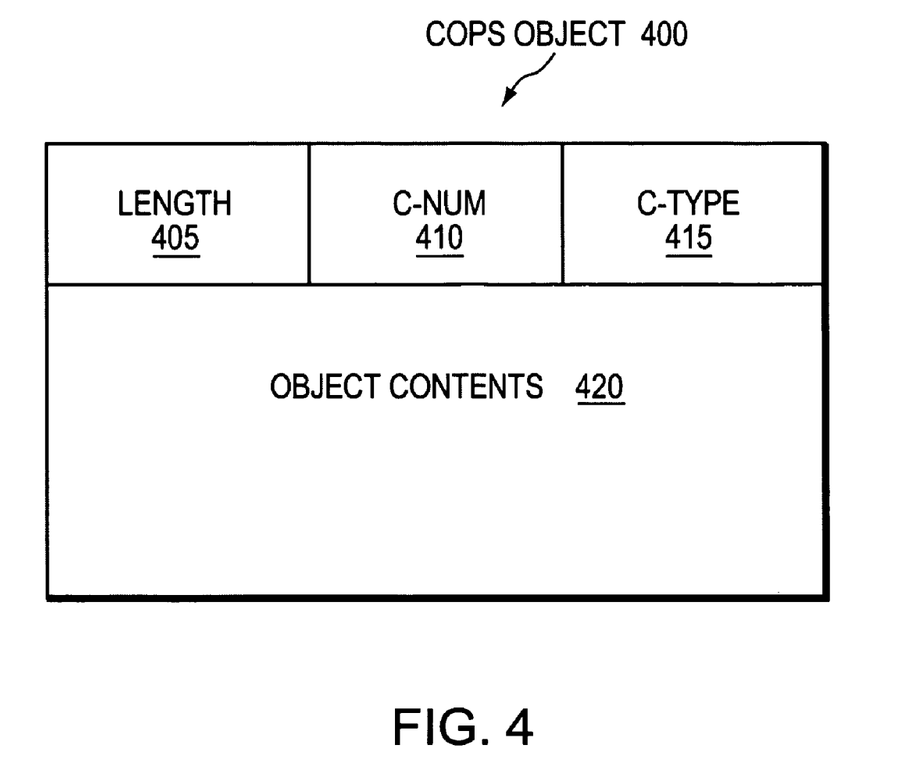
FIG. 4 is a schematic block diagram illustrating the format of a COPS Object that may be advantageously used with the present invention.

In the illustrative embodiment described herein, communications with the PDP are transmitted in accordance with the COPS Protocol. Each PCE may create a COPS Protocol Request message (REQ) that is used to request a policy decision regarding the TE-LSP in question, to which the PDP may return a COPS Protocol Decision message (DEC). Once the TE-LSP is set up, the PEP may create a COPS Protocol Report State message (RPT) to report the success of the TE-LSP. Notably, the COPS Protocol messages may include one or more novel COPS objects 400 used to convey information in accordance with the present invention, as noted above. FIG. 4 is a schematic block diagram illustrating a COPS object 400 that may be advantageously used with the present invention. Generally, all COPS objects 400 follow the same format as seen in FIG. 4. The Length field 405 describes the length of the object, including the header (e.g., in octets). The C-Num field 410 typically identifies the class of information contained in the object, while the C-Type field 415 stores a value that identifies the subtype or version of the information contained in the object, which is defined by each C-Num value. The Object Contents field 420 contains the relevant information of the object 400, as defined by each C-Num and C-Type combination. Those skilled in the art will understand that the use of COPS objects 400 is merely representative, and that other objects, such as type/length/value (TLV) encoded formats, may be used in accordance with the present invention. Those skilled in the art will also understand that the use of the COPS Protocol is merely an example, and that other communication protocols may be used with the present invention.

In accordance with one aspect of the present invention, the PCE in the local domain (e.g., BR3*) receives a path computation request from the remote domain (e.g., from a PCC, such as a head-end node, HE1, or other PCE, BR1*) having a set of constraints for the desired path. These constraints may include, inter alia, bandwidth, preemption, pool-type, class types, loss constraints, delay constraints, etc. The PCE determines from these constraints the relevant subset of constraints regarding the policy based on local configuration (e.g., bandwidth and preemption). The PCE may use only a subset of constraints when it is configured only to verify a few parameters. Upon determining the relevant subset, the PCE sends a request, e.g., a COPS REQ, to the local PDP (e.g., PDP1) listing the subset of constraints to check against an inter-domain policy. The subset of constraints may be carried within a new COPS object 400, such as with newly defined C-Num and C-Type values, described above. Within the request, the PCE may also include an identification of the remote domain (and possibly the source address) from which the path computation request was received. To determine the identification of the remote domain, the PCE performs a conventional lookup, such as to a BGP table, to match the source address of the request to a particular domain or AS (e.g., to obtain a corresponding AS number). The domain identification may be carried within the same COPS object 400 as the subset of constraints, or a new, separate COPS object 400.

The PDP receives the request and determines whether to allow or deny the request based on the subset of constraints as compared to local policy configuration and the current state of other TE-LSPs. The local policy constraints may be configured for individual TE-LSPs, individual links, a set of links, a particular inter-domain set of links, or an overall inter-domain policy. For example, the local domain may limit the total aggregate bandwidth across all inter-domain TE-LSPs from AS1 to a total of 100 Mb/s, and/or limit the number of TE-LSPs to 20. The PDP may be configured for a finer granularity, such as a number of TE-LSPs per class of traffic, preemption values, etc., as will be understood by those skilled in the art. Notably, at least a semi-stateful implementation of the PDP is necessary because the policy decision depends on currently established inter-domain TE-LSPs. For instance, if there are currently 83 Mb/s reserved for TE-LSPs from the remote domain, and the policy defines a total limit of 100 Mb/s, the PDP is required to know that only 17 Mb/s are available for reservation based on the inter-domain policy, regardless of the actual utilization of the inter-domain link bandwidths. In contrast with conventional usage of a COPS policy server, as understood by those skilled in the art, the amount of states maintained by the PDP in accordance with the present invention may be limited to only a few parameters or simply one parameter, such as, e.g., bandwidth. A detailed description of the semi-stateful implementation and notifications of TE-LSP states are described in detail below.

Upon making a policy-based decision, the PDP returns the appropriate response to the PCE, e.g., through a COPS DEC, and the PCE either continues path computation or rejects the request accordingly. The response from the PDP may be either a binary "allow/deny" response, or may instead contain a more detailed description of the reasons for allowance/denial. For example, the PDP may indicate as a reason for denial that a per-link policy would be violated if the new TE-LSP was established over the link from BR1* to BR3*. The PCE may adjust its path computation based on information returned by the PDP, and may attempt to find an alternate path via some other link (e.g., between BR2 and BR4), potentially issuing another authorization request to the PDP based on this new path. As such, multiple interactions between the PCE and PDP may be required in some instances due to interdependencies between the TE-LSP path computation and inter-domain policy decisions. It should be noted that in the event of a denial, the PCE may notify the requester of a policy violation along with the appropriate parameters in the event a request is rejected. As will be understood by those skilled in the art, if no paths exist which meet the constraints of the path computation request, the PCE rejects the request prior to requesting a policy decision from the PDP.

In accordance with another aspect of the present invention, after the path computation request is allowed and completed, the local PEP (e.g., a border router, BR) receives a signal to establish the TE-LSP, and appropriate traffic conditioning mechanisms are activated and configured (e.g., programmed) on the PEP. Traffic conditioning mechanisms involve reserving the resources on the PEP for the TE-LSP, updating routing tables, etc., as will be understood by those skilled in the art. In addition to programming conventional RSVP-TE parameters (e.g., bandwidth), the PEP sends a TE-LSP "state notification" message to the local PDP to update the PDP of the state of the TE-LSP. The state notification message is illustratively embodied as a COPS RPT. The state notification message is configured to carry various information about the TE-LSP, such as the origin domain, the destination, the bandwidth, and other characteristics relevant to inter-domain policy (e.g., preemption level, pool-type, etc.) This implementation specific information may be carried in a novel COPS object 400, as described above.

Figure 5:
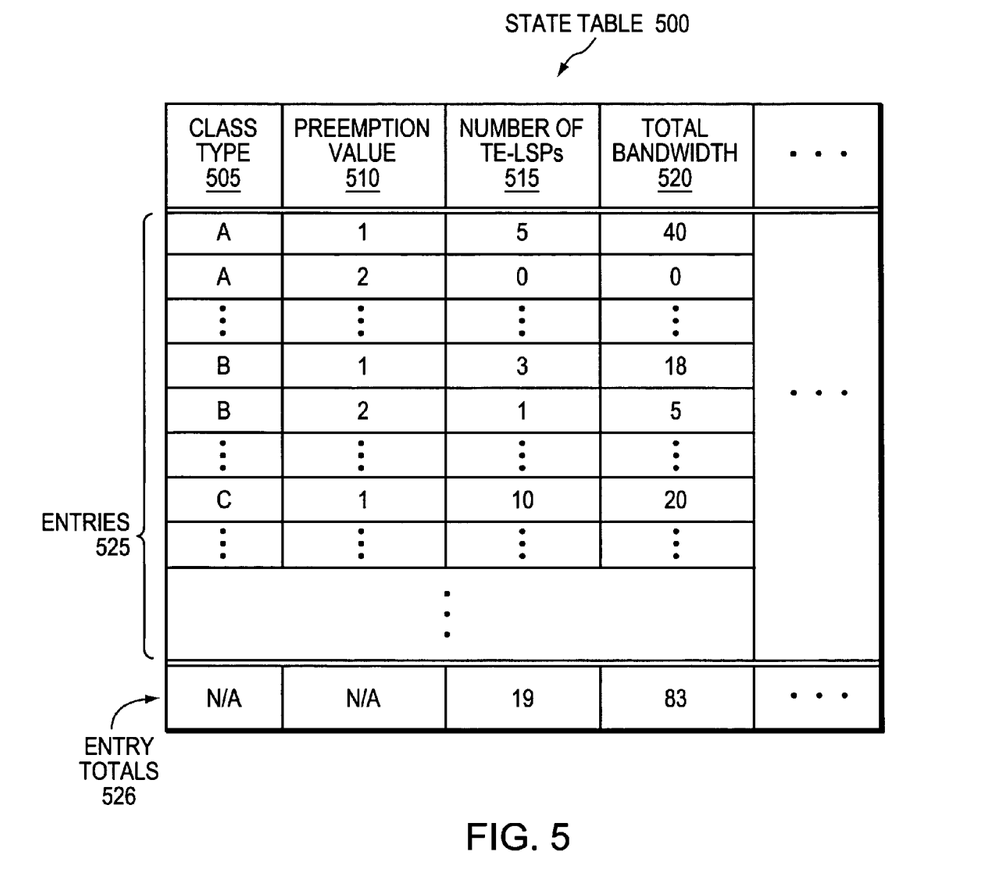
FIG. 5 is a schematic block diagram of a state table that may be advantageously used with the present invention.

The PDP receives the state notification from the PEP, and stores values contained therein in a data structure, such as state table 500, for use with future policy-based decisions, as described above. FIG. 5 is a schematic block diagram of a state table 500 that may be advantageously used with the present invention. State table 500 is illustratively stored in memory 240 and includes one or more entries 525, each comprising a plurality of fields for storing, inter alia, a class type 505, a preemption value 510, a number of TE-LSPs 515, total bandwidth 520 (e.g., in Mb/s), etc. An entry total 526 may also be stored for relevant fields. The state table 500 is illustratively maintained and managed by PDP process 246. To that end, the PDP process 246 maintains the states of variously categorized TE-LSPs provided by the state notification messages from PEPs, such as BR4, in order to make policy-based decisions on inter-domain TE-LSPs. Notably, a state table 500 may be associated with a separate remote domain, since each remote domain may have an individual inter-domain policy with the local domain.

For example, assume that the state table 500 is used for remote domain AS1. Class types A, B, and C in field 505 may represent any user-configurable type, such as Voice transmissions, Data transmissions, or others, as will be understood by those skilled in the art. Within each type, a preemption value 510 may be used to provide further granularity of TE-LSP classification. Further assume that the current state of the network indicates the number of TE-LSPs and total bandwidth of TE-LSPs for each entry to be as shown in fields 515 and 520, respectively, resulting in an entry total 526 of, e.g., 19 TE-LSPs and 83 Mb/s, also respectively. Notably, the fields shown in state table 500 are merely to be taken as representative examples. The fields of state table 500 should correspond to the corresponding inter-domain policy. Those skilled in the art will understand that any number of fields may be used, including a single field, e.g., designating the total bandwidth.

In response to the state notification message from the PEP, the PDP replies to the PEP with a QoS template, which the PEP enforces upon traffic over the TE-LSP. The QoS template may first define how strict the enforcement of the reserved resources for the TE-LSP is to be. For example, strict policing drops traffic packets above reserved resources (e.g., 20 Mb/s), traffic shaping buffers traffic packets (e.g., "leaky buckets") in order to meet the reserved resources, and traffic marking marks traffic packets transmitted above the reserved resources to enable subsequent monitoring and/or managing. The QoS template may also define one or more margins by which the PEP enforces the reserved resources. A 10% margin, for instance, allows a TE-LSP to utilize up to 10% more resources (e.g., bandwidth) than reserved for that TE-LSP. In the above example, a 20 Mb/s TE-LSP allows utilization up to 22 Mb/s. Also, to account for bursts of traffic over a TE-LSP, the margin may be configured for a certain amount of time, e.g., 5 minutes. In this case, if a TE-LSP utilizes more than the reserved resources for more than 5 minutes, the PEP may police, buffer, mark, etc., according to the QoS template. Combinations may also be used, such as allowing up to 10% margin for up to 5 minutes, etc. In addition to defining the enforcement of each TE-LSP, the QoS template may further define the enforcement for groups of TE-LSPs, such as those over the same link, or over any link to the same remote domain, etc. Those skilled in the art will understand that each inter-domain policy may have its own QoS template(s).

Notably, the QoS templates are flexible, in that they may vary between TE-LSPs or even between PEPs depending upon the current state of the network. For instance, if the network is crowded with many TE-LSPs, the QoS template may instruct a stricter enforcement than it would if there are only a few small TE-LSPs. Or, in the event one PEP has a different configuration than other, e.g., can handle less traffic, the QoS may be stricter on the smaller PEP because of its inherent limitations. Also, it should be noted that the PDP may send new QoS templates to the PEP to update the enforcement of a preexisting TE-LSP based on changing conditions of the network.

When the TE-LSP is to be torn down, the PEP sends another state notification message to the local PDP to again update the state of the TE-LSP such that the PDP is aware of freed resources for policy-based decision making. In other words, the PDP updates the state table 500 to reflect the changed state (torn-down) of the TE-LSP. While the example herein is shown with the PEP sending state notification messages, it will be understood by those skilled in the art that other network nodes aware of the TE-LSP may update the PDP, e.g., a PCE or in some instances the head-end node of the TE-LSP.

Figure 6:
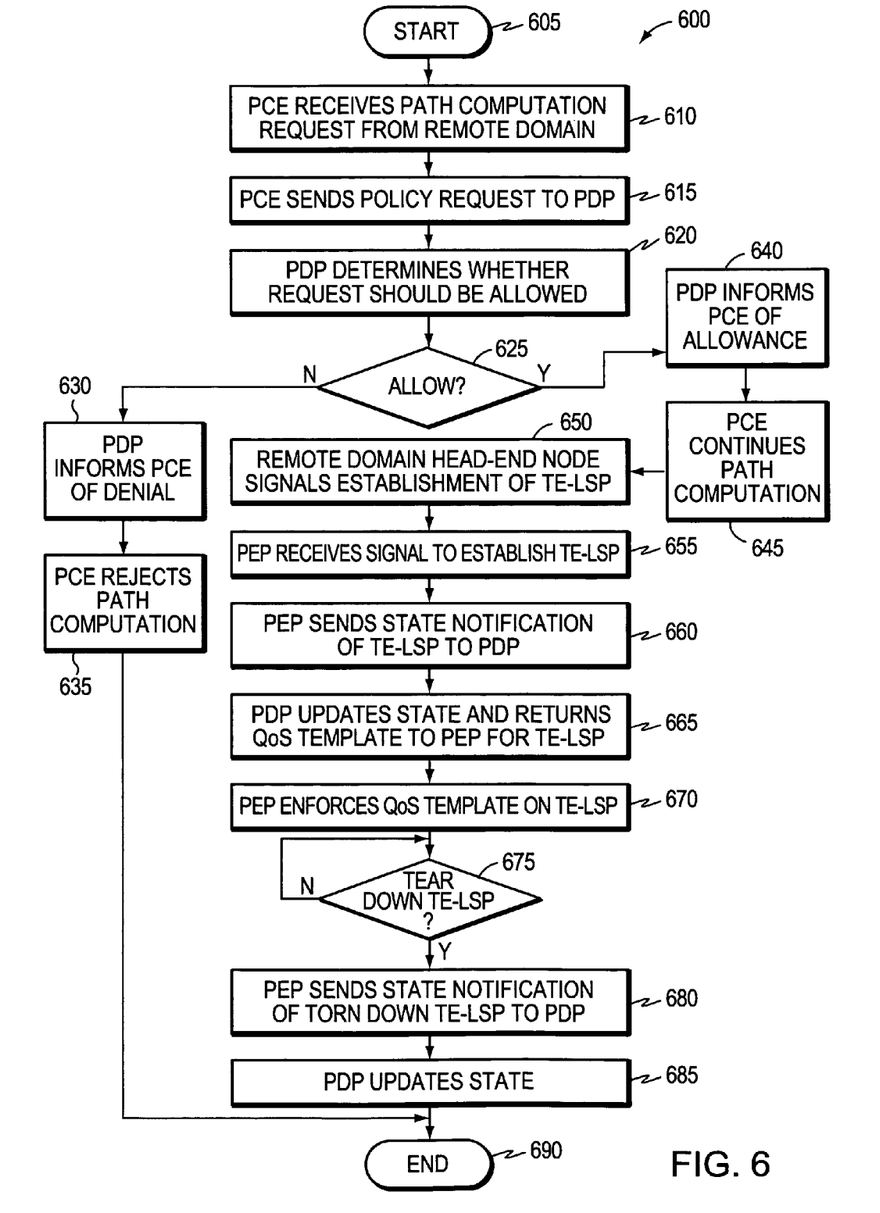
FIG. 6 is a flowchart illustrating a sequence of steps for dynamically enforcing inter-domain policy and QoS for inter-domain TE-LSPs in accordance with the present invention.

FIG. 6 is a flowchart illustrating a sequence of steps for dynamically enforcing inter-domain policy and QoS for inter-domain TE-LSPs in accordance with the present invention. Sequence 600 starts at step 605 and continues to step 610 where the PCE (e.g., BR3*) of the local domain (e.g., AS2) receives a path computation request from a remote domain (e.g., AS1). In step 615, the PCE sends a policy request message (REQ) to the policy server or PDP (e.g., PDP1) of the local domain. The PDP determines whether the request should be allowed in step 620, according to a configured inter-domain policy between the local and remote domains. Notably, as mentioned above, the request message from the PCE contains an identification of the remote domain from which the path computation request was received.

If the request does not comply with the inter-domain policy and the PDP does not allow the request in step 625, the PDP informs the PCE of the denial (e.g., with a decision message, DEC) in step 630. The PCE receives the denial and, in step 635, rejects the path computation request. The sequence then ends at step 690. If, on the other hand, the request complies with the inter-domain policy, the PDP allows the request in step 625, and informs the PCE of the allowance (e.g., a DEC) in step 640. The PCE receives the allowance, and continues the path computation in step 645. Assuming the path computation completes successfully, the remote domain head-end node signals the establishment of the TE-LSP in step 650, and the PEP (e.g., BR4) receives the signal in step 655. Upon receiving the signal, the PEP sends a state notification message (e.g., an RPT) to the PDP in step 660. The PDP receives the notification and updates the state of the TE-LSP (e.g., in table 500), and returns a corresponding QoS template to the PEP in step 665 as described above.

Upon receiving the QoS template for the TE-LSP, the PEP initiates enforcement of the QoS at step 670. The PEP continues to enforce the QoS template until the TE-LSP is torn down in step 675. Notably, as mentioned above, the QoS template may be updated by the PDP during the existence of the TE-LSP. When the TE-LSP is torn down, the PEP sends another state notification message to the PDP in step 680 to update the PDP of the torn-down state of the TE-LSP. At step 685, the PDP receives the notification and updates the state of the TE-LSP, thereby freeing up policy-based decision resources for the inter-domain policy. The sequence then ends at step 690.

Advantageously, the novel technique dynamically enforces inter-domain policy and QoS for TE-LSPs between a local domain and a remote domain in a computer network. By creating a novel interdependency between the PCE and PDP, the inventive technique provides an efficient mechanism for dynamically maintaining inter-domain policies on TE-LSPs while computing paths between domains and for enforcing an appropriate QoS on each TE-LSP once the TE-LSP is set up at a PEP. Also, the inventive technique provides an alternative to sub-optimal inter-domain policy and QoS techniques, such as cumbersome manual configuration, that can dynamically adjust to actual traffic patterns of the computer network.

While there has been shown and described an illustrative embodiment that dynamically enforces inter-domain policy and QoS for TE-LSPs between a local domain and a remote domain in a computer network, it is to be understood that various other adaptations and modifications may be made within the spirit and scope of the present invention. Notably, the invention has been shown and described herein using COPS Protocol messages and extensions to COPS messages to transmit relevant information. However, the invention in its broader sense is not so limited, and may, in fact, be used with other communication protocols. Moreover, while the above description describes performing the technique with a PCE, the invention may also be advantageously used without PCEs. For example, the remote domain head-end node may use loose hop routing, as understood by those skilled in the art, to generate a TE-LSP. In this instance, the border router receiving the loose hop TE-LSP communicates with the PDP in much the same manner as the PCE as described above (e.g., the border router becomes a PCE for the loose hops). In addition, while each of the functionalities of the present invention (PCE, PEP, PDP, etc.) have been referenced as separate nodes/routers, those skilled in the art will understand that any number of functionalities may be on any number of nodes/routers (e.g., a single node/router), in which case the communications between functionalities may be internal to the node/router.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically enforcing inter-domain policy and quality of service (QoS) for Traffic Engineering (TE) Label Switched Paths (LSPs) between a local domain and a remote domain in a computer network, the method comprising:
   receiving a path computation request at a Path Computation Element (PCE) of the local domain, the path computation request for an inter-domain TE-LSP from the remote domain to the local domain;
   sending a policy verification request from the PCE to a Policy Decision Point (PDP) of the local domain, the policy verification request including one or more constraints of the inter-domain TE-LSP to be checked against configured policy for the remote domain and previously established TE-LSPs from the remote domain; and
   determining at the PDP of the local domain whether the TE-LSP is allowed based on configured policy for the remote domain and previously established TE-LSPs from the remote domain.

2. The method as in claim 1, further comprising:
   establishing the TE-LSP at a policy enforcement point (PEP) of the local domain;
   sending a state notification message indicating the establishment of the TE-LSP from the PEP to the PDP; and in response
   returning a QoS template from the PDP to the PEP, the QoS template indicating configured QoS guidelines the PEP must enforce for that TE-LSP.

3. The method as in claim 2, further comprising:
   tearing down the TE-LSP; and
   sending a state notification message indicating the tearing down of the TE-LSP from the PEP to the PDP.

4. The method as in claim 1, further comprising:
   communicating with the PDP using the Common Open Policy Service (COPS) Protocol.

5. The method as in claim 1, wherein the path computation request has a set of constraints, the method further comprising:
   determining the one or more constraints to be a subset of constraints contained within the path computation request at the PCE; and
   sending the policy verification request from the PCE to the PDP with the subset of constraints.

6. The method as in claim 5, further comprising:
   determining at the PDP whether the TE-LSP is allowed based on configured policy for the remote domain, as applied to the subset of constraints.

7. The method as in claim 1, further comprising:
   determining a domain identification of the remote domain at the PCE; and sending the policy verification request from the PCE to the PDP with the domain identification.

8. The method as in claim 1, further comprising:
returning a policy decision message from the PDP to the PCE indicating whether the TE-LSP is allowed or denied.

9. The method as in claim 8, further comprising:
including within the policy decision message an indication of a reason for denial.

10. The method as in claim 9, further comprising:
computing a new path for the TE-LSP at the PCE, wherein the PCE computes the path according to the reason for denial included within the policy decision message.

11. The method as in claim 10, further comprising:
sending a new policy verification request from the PCE to the PDP for the new path.

12. An apparatus for dynamically enforcing inter-domain policy and quality of service (QoS) for Traffic Engineering (TE) Label Switched Paths (LSPs) between a local domain and a remote domain in a computer network, the apparatus comprising:
   means for receiving a path computation request at a Path Computation Element (PCE) of the local domain, the path computation request for an inter-domain TE-LSP from the remote domain to the local domain;
   means for sending a policy verification request from the PCE to a Policy Decision Point (PDP) of the local domain, the policy verification request including one or more constraints of the inter-domain TE-LSP to be checked against configured policy for the remote domain and previously established TE-LSPs from the remote domain; and
   means for determining at the PDP of the local domain whether the TE-LSP is allowed based on configured policy for the remote domain and previously established TE-LSPs from the remote domain.

13. The apparatus as in claim 12, further comprising:
   means for establishing the TE-LSP at a policy enforcement point (PEP) of the local domain;
   means for sending a state notification message indicating the establishment of the TE-LSP from the PEP to the PDP; and in response
   means for returning a QoS template from the PDP to the PEP, the QoS template indicating configured QoS guidelines the PEP must enforce for that TE-LSP.

14. A system for dynamically enforcing inter-domain policy and quality of service (QoS) for Traffic Engineering (TE) Label Switched Paths (LSPs) between a local domain and a remote domain in a computer network, the system comprising:
   a Policy Decision Point (PDP) of the local domain configured to determine whether an inter-domain TE-LSP is allowed based on configured policy for the remote domain and previously established TE-LSPs from the remote domain; and
   a Path Computation Element (PCE) of the local domain, the PCE configured to i) receive a path computation request for the inter-domain TE-LSP from the remote domain to the local domain, and ii) send a policy verification request to the PDP, the policy verification request including one or more constraints of the inter-domain TE-LSP to be checked against configured policy for the remote domain and previously established TE-LSPs from the remote domain.

15. The system as in claim 14, further comprising:
   a policy enforcement point (PEP) of the local domain configured to establish the inter-domain TE-LSP and send a state notification message indicating the establishment of the TE-LSP to the PDP; and
   a QoS template, the QoS template sent from the PDP to the PEP and adapted to indicate configured QoS guidelines the PEP must enforce for that TE-LSP.

16. A Path Computation Element (PCE) in a local domain for use with dynamically enforcing inter-domain policy and quality of service (QoS) for Traffic Engineering (TE) Label Switched Paths (LSPs) between the local domain and a remote domain in a computer network, the PCE comprising:
   a network interface adapted to receive a path computation request for an inter-domain TE-LSP from the remote domain to the local domain;
   a processor adapted to create a policy verification request for the TE-LSP, the policy verification request including one or more constraints of the TE-LSP to be checked against configured policy for the remote domain and previously established TE-LSPs from the remote domain; and
   a network interface adapted to send the policy verification request to a policy decision point (PDP) of the local domain and to receive an inter-domain policy-based response from the PDP;
   wherein the processor is further adapted to respond to the path computation request based on the inter-domain policy-based response received from the PDP.

17. A Policy Decision Point (PDP) in a local domain for use with dynamically enforcing inter-domain policy and quality of service (QoS) for Traffic Engineering (TE) Label Switched Paths (LSPs) between the local domain and a remote domain in a computer network, the PDP comprising:
   a memory adapted to store states of previously established inter-domain TE-LSPs from the remote domain;
   a network interface adapted to receive a policy verification request for a new inter-domain TE-LSP from a path computation element (PCE) of the local domain, the policy verification request including one or more constraints of the new inter-domain TE-LSP to be checked against configured policy for the remote domain and states of previously established inter-domain TE-LSPs from the remote domain;
   a processor adapted to determine whether the new inter-domain TE-LSP is allowed based on configured policy for the remote domain and states of previously established inter-domain TE-LSPs from the remote domain; and
   a network interface adapted to send a response to the policy verification request based on the determination.

18. A Policy Enforcement Point (PEP) in a local domain for use with dynamically enforcing inter-domain policy and quality of service (QoS) for Traffic Engineering (TE) Label Switched Paths (LSPs) between the local domain and a remote domain in a computer network, the PEP comprising:
   a network interface adapted to i) receive a signal to establish an inter-domain TE-LSP from the remote domain to the local domain, ii) send a state notification message indicating establishment of the TE-LSP to a Policy Decision Point (PDP), and iii) receive a QoS template from the PDP in response to the state notification message, the QoS template indicating configured QoS guidelines for that TE-LSP; and
   a processor adapted to establish the inter-domain TE-ISP and to enforce the QoS guidelines for that TE-LSP as indicated in the QoS template.

* * * * *

UNITED STATES PATENT AND TRADEMARK OFFICE
CERTIFICATE OF CORRECTION

| | | |
|---|---|---|
| PATENT NO. | : 7,599,302 B2 | Page 1 of 1 |
| APPLICATION NO. | : 11/184586 | |
| DATED | : October 6, 2009 | |
| INVENTOR(S) | : Jean Philippe Vasseur | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Col. 4, Line 49, please amend as shown:

domain policy limits the remote domain to send[[ 10]] 100 Mb/s of

Col 16, Line 60, please amend as shown:

a processor adapted to establish the inter-domain[[ TE-ISP]] TE-LSP

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,599,302 B2
APPLICATION NO. : 11/184586
DATED : October 6, 2009
INVENTOR(S) : Vasseur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Twenty-eighth Day of September, 2010

David J. Kappos
*Director of the United States Patent and Trademark Office*